（12）United States Patent
Pogrebinsky (10) Patent No.: US 8,179,625 B1
(45) Date of Patent: May 15, 2012

(54) METHOD FOR FAST VERIFICATION OF SERVO PATTERNS AND TEST ON MAGNETIC MEDIA

(75) Inventor: Vlad Pogrebinsky, Campbell, CA (US)

(73) Assignee: Xyratex Technology Limited, Hampshire (GB)

( * ) Notice: Subject to any disclaimer, the term of this patent is extended or adjusted under 35 U.S.C. 154(b) by 501 days.

(21) Appl. No.: 12/408,257

(22) Filed: Mar. 20, 2009

Related U.S. Application Data (60) Provisional application No. 61/039,639, filed on Mar. 26, 2008.

(51) Int. Cl.
*G11B 27/36* (2006.01)
(52) U.S. Cl. .................................................. 360/31
(58) Field of Classification Search .................... None
See application file for complete search history.

(56) References Cited

U.S. PATENT DOCUMENTS

| 5,050,169 | A | 9/1991 | Monett |
| 6,057,926 | A | 5/2000 | Horai |
| 6,263,462 | B1 | 7/2001 | Hatano et al. |
| 6,292,317 | B1 * | 9/2001 | Alexander ............. 360/31 |
| 6,766,416 | B2 | 7/2004 | Bachmat |
| 7,139,145 | B1 | 11/2006 | Archibald et al. |
| 7,196,513 | B2 | 3/2007 | Perez |
| 7,243,043 | B2 | 7/2007 | Shin |
| 2006/0269384 | A1 * | 11/2006 | Kiaie et al. ............. 414/222.02 |

\* cited by examiner

*Primary Examiner* — Daniell L Negron
*Assistant Examiner* — Regina N Holder
(74) *Attorney, Agent, or Firm* — Womble Carlyle Sandridge & Rice LLP (57) ABSTRACT

High density magnetic disks are each placed on testers. Each tester tests a portion of the disk. If the tester finds an error, a new disk is placed on the tester. The tester goes to the allocated portion of the disk and tests whether the error is on the new disk. This process may be repeated several times to confirm the error. After an error is confirmed an alarm is sent indicating that there may be a defect in the disk manufacturing process.

19 Claims, 7 Drawing Sheets

Figure 10

METHOD FOR FAST VERIFICATION OF SERVO PATTERNS AND TEST ON MAGNETIC MEDIA

CROSS-REFERENCE TO RELATED APPLICATION

This application claims the benefit of U.S. provisional patent application 61/039,639, filed, Mar. 26, 2008, which is incorporated by reference along with all other references cited in this application.

BACKGROUND OF THE INVENTION

This invention relates to the field of magnetic storage drives and more specifically to testing of high-density platters for magnetic storage drives.

Hard drives have revolutionized the storage of data. The amount of data stored electronically continues to increase dramatically: Data that was once stored on paper and filed away in boxes, shelves, folders, and cabinets are now, more likely than not, stored on a hard drive. The amount of data that is stored and continuing to be stored on hard drives is daunting.

Some examples of data that may be stored on hard drives include business information (e.g., financial reports and figures, budgets, marketing research, employee information, strategies, manufacturing processes), personal information (e.g., vacation pictures and videos, songs), academic research (e.g., medical findings, clinical studies), books, and movies just to name a few examples. The stored data ranges from the trivial (e.g., a person's grocery list) to the most sensitive and critical (e.g., state secrets, nuclear weapon design).

Hard drives can be found not just in computers, but also in music players (e.g., MP3 player), digital video recorders (e.g., DVR or PVR), television sets, and even cars. Millions of hard drives continue to be produced each year.

There is continuing demand for hard drives that store greater amounts of data in the same space (i.e., higher density storage), are cheaper, and that are more reliable.

Therefore, there is a need for improved testing systems and techniques for hard drive testing.

BRIEF SUMMARY OF THE INVENTION

Current generations of hard drives have high areal densities of 200,000 tracks per inch (200 KTPI). The new generations of hard drives will increase this number to 400 KTPI and above. As the number of tracks increase, the time required to verify and test disks increases proportionally. As a result, any defect in the manufacturing process can go undetected for a long period of time, which will cause a production of a large number of defective disks.

A method and device significantly increases verification and test speed by using N number of testers, each testing a disk simultaneously. Each tester tests only portion of the disk equal to Disk Area/N. Testers are arranged in a robotic work cell with a robot putting disks on and removing disks from the tester.

In the case where any tester finds fatal error, it sends a communication to the cell controller, identifying a location of a defect on the disk. Cell controller commands the robot to remove the rejected disk and put a new disk on the tester and starts the test again. Tester goes to the allocated portion of the disk and performs the test again. This process may be repeated several times, specified by the user, until the location of the defect is confirmed.

Then cell controller sends an alarm message to the main process center, identifying the process problem. As all disks and cassettes with disks are tracked through the manufacturing process with bar codes or similar identification marks, it makes it easy to identify which part of the process created this defect and fix the process.

In a specific implementation, a method of testing a magnetic disk includes using a first robotic arm, loading a first magnetic disk having a disk layout onto a first tester, using the first robotic arm, and loading a second magnetic disk having the disk layout onto a second tester. Then, using the first tester, running a first test on the first magnetic disk on a first disk portion of the disk layout. Using the second tester, running a second test on the second magnetic disk on a second disk portion of the disk layout. The second disk portion is different from the first disk portion. Furthermore, the second test is being run concurrently when the first test is being run. While the running a first test on the first magnetic disk, after detecting a defect error on the first magnetic disk, storing a location of the defect error, unloading the first magnetic disk, and loading a third magnetic disk. And using the first tester, running a third test on the third magnetic disk on the first disk portion of the disk layout.

The defect error detected on the first magnetic disk error may be referred to as a first defect error identified during the first test.

In an implementation, there is no overlapping area locations between the first and second magnetic disks. The defect may include a servo pattern read error or at least one of a write magnetic media error or read magnetic media error.

The method may further include counting a number of first defect errors when testing using the first tester during a first time period and when the number of first defect errors exceeds a threshold value during the first time period, providing a user-visible indication of a first tester error condition.

The user-visible indication of a first tester error condition may be shown on a computer display.

In another implementation, the method includes counting a number of first defect errors when testing using the first tester during a first time period, counting a number of magnetic disks tested during the first tester during a first time period, when the number of first defect errors divided by the number of magnetic disks testes exceeds a threshold value during the first time period, indicating a first tester error condition.

The method may further include transmitting an indication of the first tester error condition to a main test center, which the first and second testers are coupled to.

In a specific implementation a method of testing magnetic disks includes providing N testers. N is an integer 2 or greater. A magnetic disk layout has at least N portions to be tested. The method further includes using a first test program for a first tester of the N testers to test a first portion of the N portions and using a second test program for a second tester of the N testers to test a second portion of the N portions. The first portion of the disk layout has no overlap with the second portion of the disk layout.

The method may further include providing at least one automated loading mechanism for the N testers. Via the automated loading mechanism, loading a first magnetic disk onto the first tester. And, after the first magnetic disk has been tested by the first tester, via the automated loading mechanism, unloading a first magnetic disk from the first tester, where the first magnetic disk is not subsequently tested by any other tester that can be loaded via the automated loading mechanism.

The first test program may evaluate a magnetic disk for servo pattern read errors or read or write errors.

In a specific implementation, the method further includes providing a third tester, separate from the N testers, providing code to the third tester to test the first portion of the N portions, upon detecting a defect error on a first magnetic disk tested by the first tester, loading a second magnetic disk that has already been tested by the second tester onto the third tester, and using the third tester, testing the first portion of the N portions on the second magnetic disk.

During the test of the second magnetic disk on the second tester, no defect errors may be detected In another specific implementation, a system for testing magnetic disks includes a first group of N testers, where N is an integer 2 or greater. A first automated loading mechanism for the N testers of the first group. A second group of M testers, where M is an integer 2 or greater and a magnetic disk layout has at least N+M portions to be tested. A second automated loading mechanism for the M testers of the second group. A first tester of the first group, where the first tester has first executable code to test of a first portion of the N+M portions. A second tester of first group, where the second tester has second executable code to test of a second portion of the N+M portions. A third tester of the second group, where the third tester has third executable code to test of a third portion of the N+M portions, and a fourth tester of the first group, where the fourth tester has fourth executable code to test of a fourth portion of the N+M portions, where the first portion does not overlap the second, third, or fourth portions.

The system may further include a main controller, where the main controller is coupled to the first group and second group of testers. A size of each of the first, second, third, and fourth portions may be approximately the same. Upon detecting a first defect error on a magnetic disk at the first tester, the first executable code may cease further testing of the magnetic disk at the first tester.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
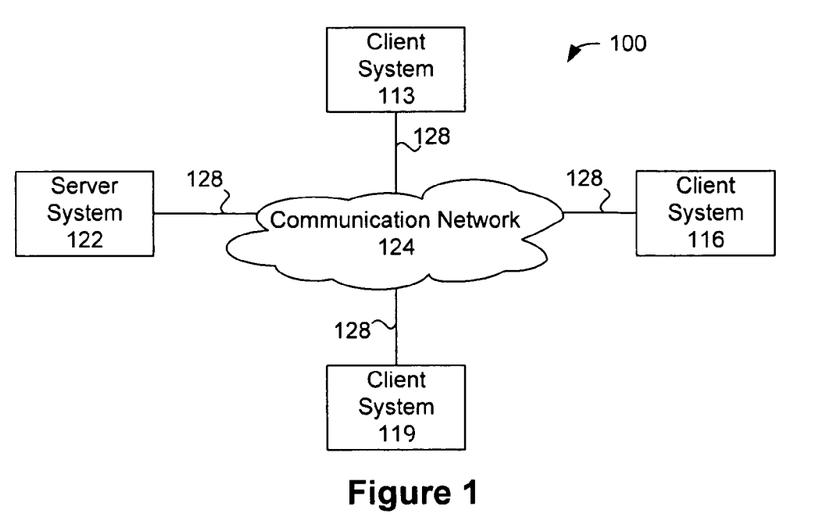
FIG. 1 is a block diagram illustrating a client-server system and network, according to one embodiment of the present invention.

FIG. 1 is a simplified block diagram illustrating a distributed computer network 100 which may include an implementation of the present invention. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
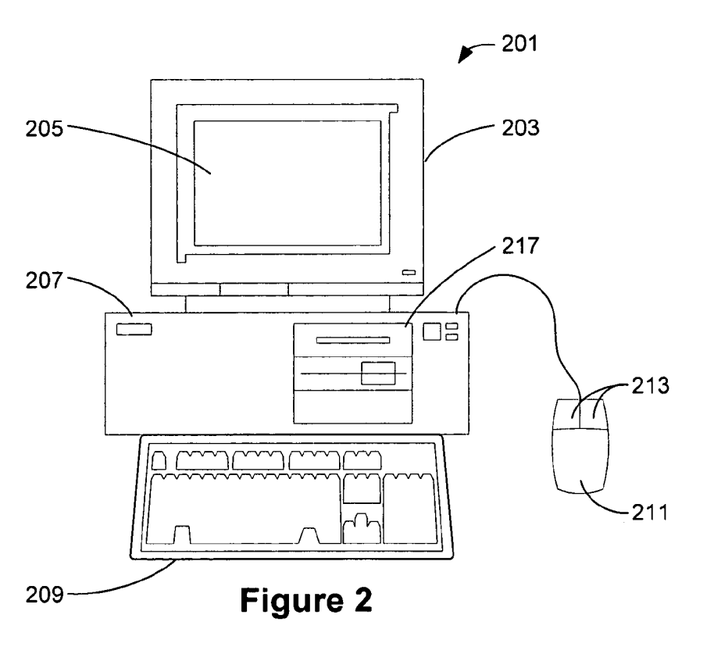
FIG. 2 is a more detailed block diagram illustrating an exemplary client or computer, according to one embodiment of the present invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disk), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
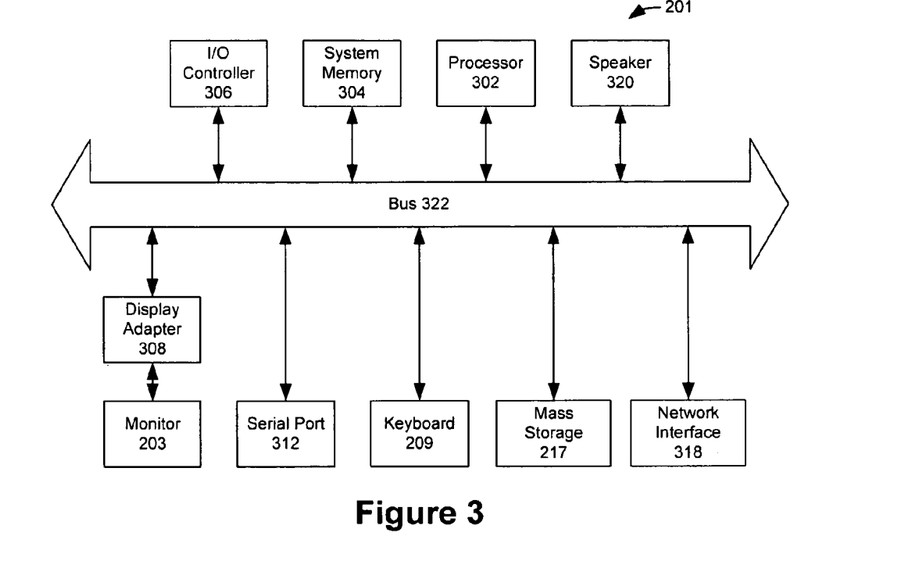
FIG. 3 is a block diagram illustrating a client computer system used to provide a user interface, according to one embodiment of the present invention.

FIG. 3 shows a system block diagram of computer system 201 which may be used to execute software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
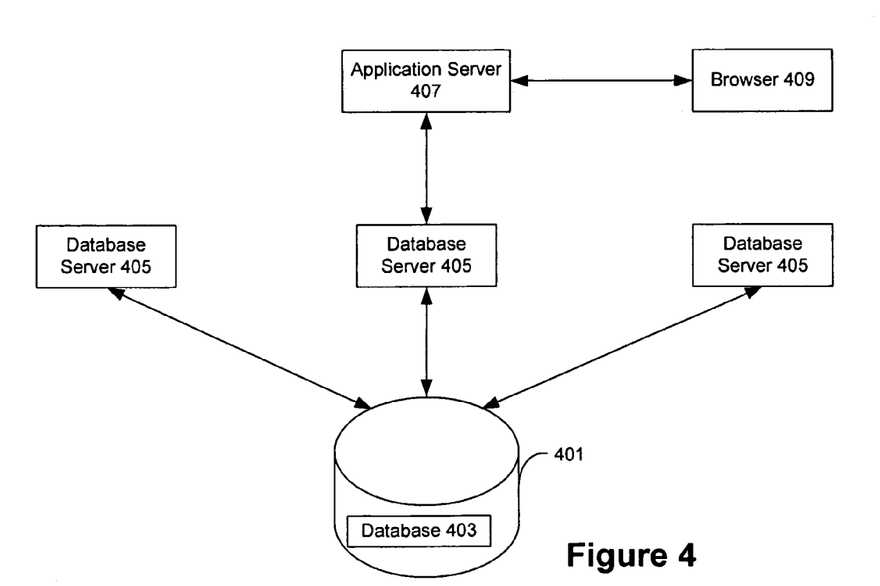
FIG. 4 is a block diagram illustrating a data source or data service in the form of a database system, according to one embodiment of the present invention.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
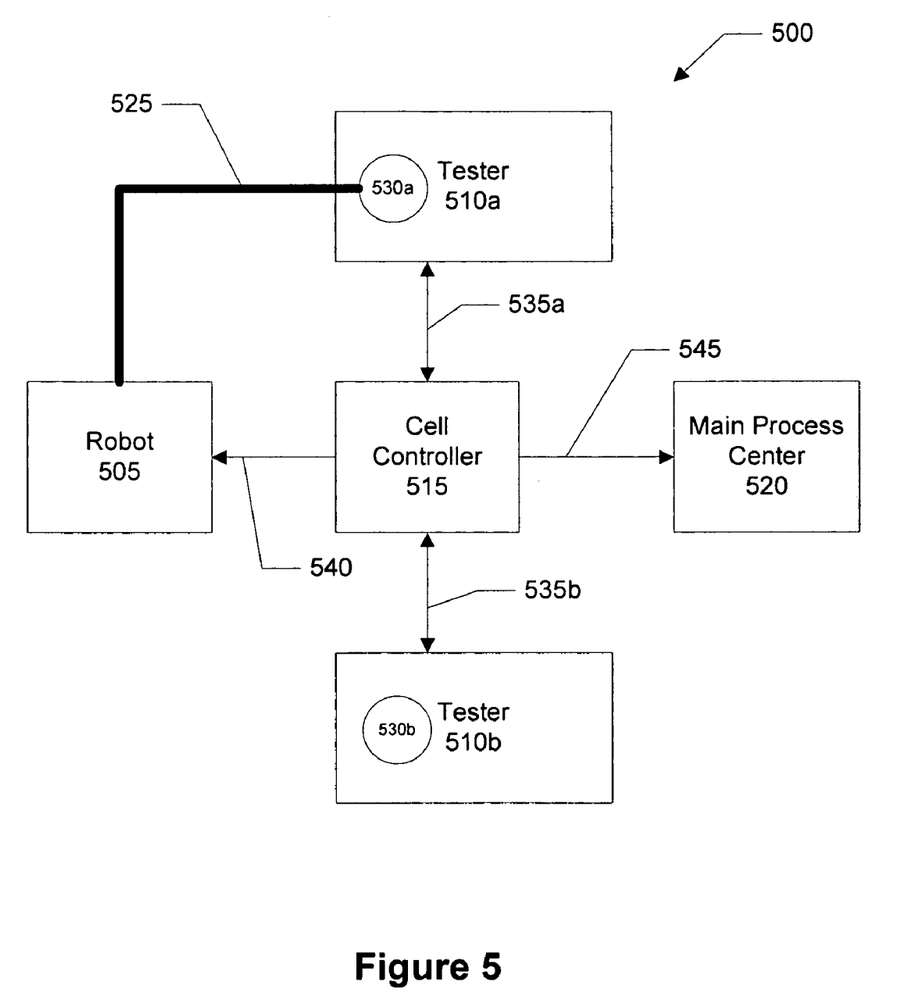
FIG. 5 shows a simplified block diagram of a testing system in which an embodiment of the invention may be implemented.

FIG. 5 shows a simplified block diagram of a testing system 500. The testing system includes a robot 505, testers 510a, and 510b, and a cell controller 515 which is connected to the robot, testers, and a main process center 520. In an implementation, the testing system is used to test magnetic storage disks. However, in other implementations, the testing system is used to test other types of products, media, or material. For example, the testing system may be used to test optical storage media (e.g., CD-ROMs, CD-RW, DVD-R, DVD-RW, or Blu-Ray discs), semiconductor chips, and other media.

The robot has an arm 525. The arm places and removes disks 530a, and 530b from the testers. The cell controller communicates with testers 510a, and 510b via communication links 535a, and 535b, respectively. The cell controller sends an output signal 540 to the robot and an output signal 545 to the main process center.

In specific implementations, the cell controller is a general purpose computer or specialized computer with hardware, such as shown in FIGS. 2-3 and described above. The cell controller includes one or more hardware components described. For example, the cell controller can include a processor, system memory, and storage (e.g., Flash drive such as solid state disk (SSD), optical drive, or hard disk) for storing executable code. The cell controller executes executable code (or computer-readable code) that embodies a technique or algorithm as described in this patent. The executable code may be in the form of software or firmware.

Some examples of programs that can be executed by the cell controller include test programs, executable code, data logging programs, data collection programs, statistical analysis tools, reference or model servo patterns, and programs to verify transcribed or stamped servo patterns as discussed in this application. A computer program product can include such programs, in any combination. And this product can be distributed through the Internet or CDs or other recordable media.

For example, during a test sequence, the cell controller runs executable code which follows the testing algorithms (i.e., procedures, steps, and protocols) discussed in this application. The executable code can be used to direct the robot (e.g., load disk onto tester and unload disk from tester). The executable code can also direct the tester (e.g., begin testing, pause testing, resume testing, and stop testing). The executable code can also direct the tester to perform any number of specific tests (e.g., verify servo pattern).

Although the figure shows only two testers, the specific number of testers in a system of the invention may vary. Having multiple testers provides for increased throughput. For example, there may be three, four, five, six, seven, eight, nine, or more than ten testers. Depending on the implementation, there may be only one tester.

The testers may be arranged in a robotic work cell. The testers may test any number of parameters of a disk such as the servo pattern, track number, data sector number, test data fields on the track, or combinations of these. The testers may test the disks simultaneously.

In the manufacture of platters for a hard disk drive, each platter is servo formatted. The servo format includes any number of concentric circular tracks radiating from a center to an edge of the disk. These circular tracks are divided into equally sized arcs or sectors. A sector may be referred to as a block.

Two or more tracks having the same track number across a stack of platters in a hard disk drive may be referred to as a cylinder. A cylinder of the hard disk drive has any number of sectors. A size of a sector generally increases as one moves from the inner to outer cylinders of the disk.

Between the sectors is a region of the disk, a wedge-shaped region referred to as the servo sector, where the servo pattern and digital data is written (or stamped, etched, laser burned, or otherwise placed on the disk) by the manufacturer. Therefore, the servo pattern is not data which was written to the disk by the tester testing the disk, but preexists on the disk before being loaded onto the tester. For each cylinder, there are multiple wedge regions and in each wedge region there is the servo pattern and digital data. The digital data is often referred to as Gray code because it is written using a Gray code format. A Gray code is a binary code in which successive numbers differ by only a single bit.

Through a controller, a tester (or the disk drive itself) reads the servo pattern and Gray code and accurately positions the head based on this information. Further, with this servo sector information, the controller can continuously correct the radial position of the appropriate head over the desired track.

The circuitry can compensate for variations in platter geometry. The variations may be caused by mechanical stress, thermal expansion, thermal contraction, or combinations of these. The head positioning components form what is sometimes referred to as a closed-loop servo system.

In an implementation, the system uses one or more statistical approaches for quality control, process control, or both. Such statistical approaches can be used to distinguish between random errors and processing errors or repeatable errors that result in unacceptable disks. A machine that produces magnetic disks may write or transcribe a servo pattern onto the disk where the servo pattern is based on a master or reference servo pattern. There may be variations between the written servo pattern and the reference servo pattern. Small variations or deviations may be acceptable. Large variations may be unacceptable. If the production process, its inputs, or its environment changes (e.g., the machine writing the servo pattern begins to wear) the variations between the written servo pattern and the reference servo pattern may become unacceptable.

Various statistical process controls can be used to indicate to the user when action should be taken in a process and when action should not be taken in the process (e.g., error is random, variation is acceptable, or error is not related to a manufacturing process). Generally, the sooner a problem in the manufacturing process is identified, the sooner the problem can be addressed so that there is less waste. One statistical approach includes testing only a fraction of the output. Testing only a fraction of the output as compared to the entire output can be used to quickly identify a processing problem that may be addressed before there is a large accumulation of waste (i.e., defective disks).

Thus, in a specific technique of the invention, each tester only tests a portion of the disk. The portion of the disk area tested by an individual tester is inversely proportional to the number of testers. For example, as the number of testers increases, the portion of the disk area tested by an individual tester decreases. Generally, each tester tests a portion of the disk given by the disk area divided by N where N is the number of testers.

For example, if there are two testers then each tester tests only a half portion of the disk. If there are three testers then each tester tests only a third portion of the disk. If there are four testers then each tester tests only a fourth portion of the disk. While the portion sizes tested may be the same, each tester may test a different portion.

In a specific implementation, there are N testers where N is an integer 2 or greater and a disk layout has at least N portions to be tested. In this specific implementation, a first test program is used for a first tester of the N testers to test a first portion of the N portions. A second test program is used for a second tester of the N testers to test a second portion of the N portions. In this specific implementation, the first and second portions do not overlap. The first and second testers may test the same disk. The first and second testers may each test a different disk.

This technique provides for quicker identification of a defect in a group of disks than would be the case if each tester had to test an entire disk. This is because it typically takes less time to test a portion of the disk than it does to test the entire disk.

For example, assume that a group includes two disks, that it takes four hours to test an entire disk, and that there are two testers that can test each disk at the same time. According to an embodiment of the invention, each tester tests only half of the disk. If it takes four hours to test an entire disk, then it takes two hours to test half the disk (e.g., four hours per disk multiplied by one half is two hours). The entire group of disks can then be tested in two hours as opposed to four hours.

While an individual disk may have certain portions that are not tested, an imaginary composite of all the different portions of the disks tested represents a disk that does have all portions tested. In other words, the system may be designed so that statistically, 100 percent of the disk is tested.

One benefit to this technique of the invention is that problems in the disk manufacturing process are identified quicker than would be the case if additional time were spent testing the entire disk. This allows the manufacturer to address the problem in the manufacturing process before additional disks are made with the flawed process. The cost savings may be significant. For example, a manufacturer may be making hundreds or thousands of disks an hour. If there is a flaw in the process then it is very likely that each disk made with that flawed process will be bad. The sooner the bad disk can be identified, then the sooner the manufacturer can correct the flawed process before hundreds or thousands more bad disks are made.

Figure 6:
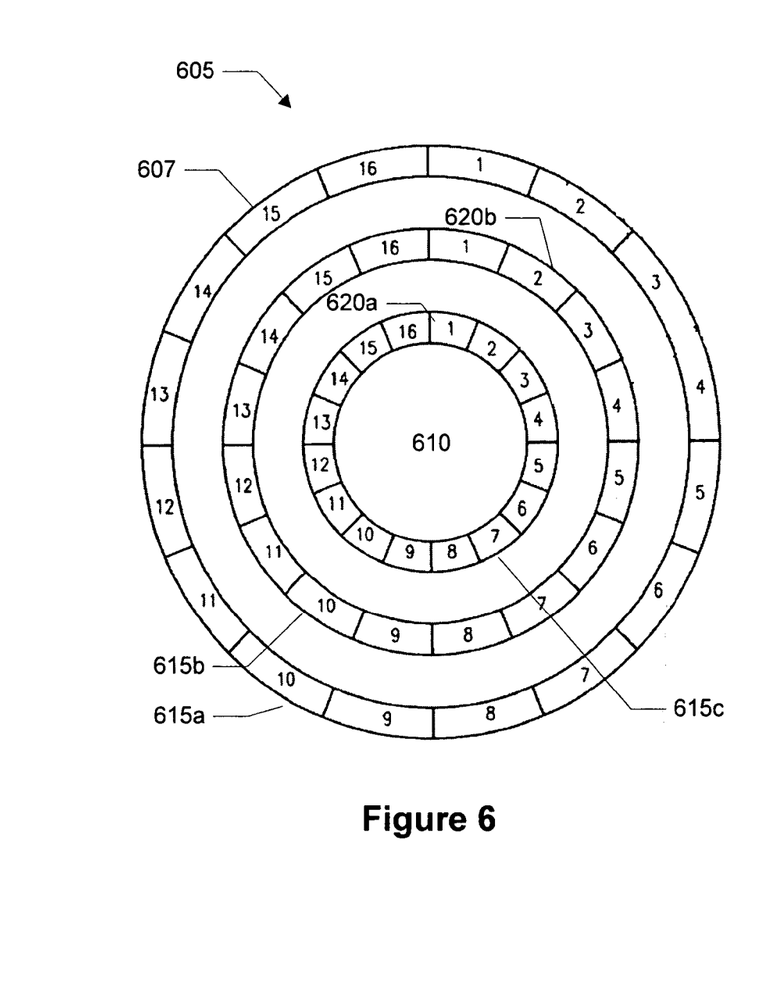
FIG. 6 shows a physical layout of a disk or platter.

FIG. 6 shows a simplified view of a physical layout 605 for a first surface 607 of a disk platter 610. The disk can have a second surface, opposite the first surface. The second surface may or may not include track positioning data used to place the drive heads in the desired position.

In this example, layout 605 includes three tracks including first, second, and third tracks 615a, 615b, and 615c, respectively. Each track includes sixteen sectors. A sector may be referenced by its track and sector number and disk surface. For example, a first sector 620a may be referenced as first surface, first track, sector 1. A second sector 620b may be referenced as first surface, second track, sector 2, and so forth. Generally, a sector stores about 512 or 256 bytes of data, but can store any amount of data.

A cluster may include third and fourth sectors. Typically, a cluster includes two or more contiguous sectors. The sectors can be physically contiguous (i.e., adjacent) as shown in the example of FIG. 6. The sectors can be both physically and logically contiguous. The sectors can be logically contiguous, but not physically contiguous, i.e., not physically adjacent.

A disk portion of the layout to be tested can include one or more tracks, one or more clusters, one or more sectors, a portion of a sector, a portion of a track, a portion of a cluster, or combinations of these. In a specific implementation, each of the sectors, tracks, or clusters of a disk portion are on a same surface of the disk. In another implementation, a disk portion has some sectors, tracks, or clusters on the first surface of the disk and other sectors, tracks, or clusters on the second surface of the disk. The sectors of a disk portion may or may not be contiguous (e.g., physically contiguous or logically contiguous). Similarly, the tracks, clusters, or both of a disk portion may or may not be contiguous.

As an example, a first portion can include the first track. The first portion can include the first sector. The first portion can include the first and second sectors. The first portion can include the first track and the second sector. The first portion can include the first cluster. The first portion can include a set or range of contiguous sectors. The first portion can include a set of noncontiguous sectors, and so forth.

In a specific implementation, each portion has the same size or same number of bytes. That is, the first portion can have a first number of bytes. A second portion can have a second number of bytes. In this specific implementation, the first and second numbers are the same or are equal.

However, in other implementations, two or more portions can have a different size. That is, the first and second numbers can be different. The first number may be greater than the second number. The second number may be greater than the first number.

Two or more portions can have the same or different number of tracks. Two or more portions can have the same or different number of clusters. Two or more portions can have the same or different number of sectors.

In a specific implementation, a portion of a disk layout will not overlap another portion of the disk layout. For example, if a first portion of the disk layout includes first sector 620a, no other portions will include first sector 620a. As another example, if the first portion includes first track 615a, no other portions will include first track 615a. In this specific implementation, there are no overlapping area locations between two disks having the disk layout. In another implementation, two or more portions of a layout include overlapping portions. For example, the two or more portions may each include the same sector.

Figure 7:
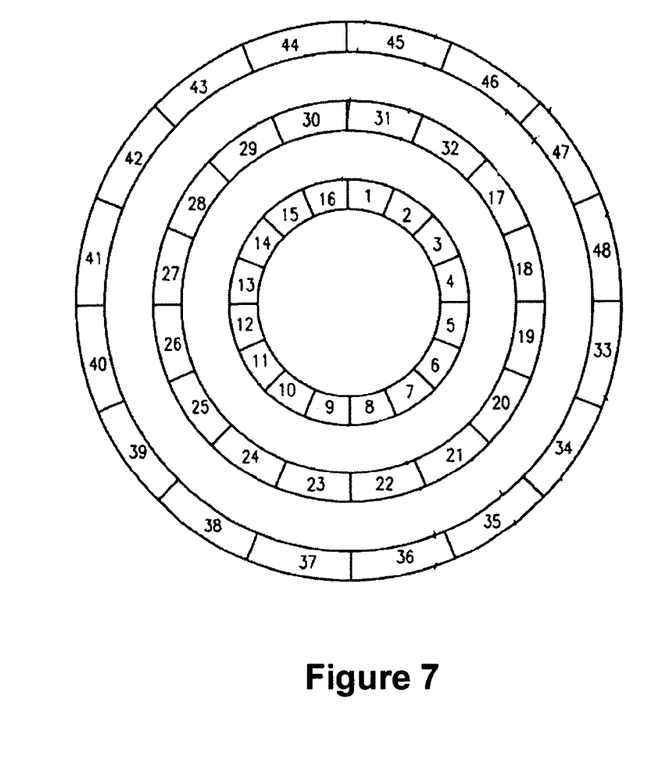
FIG. 7 shows a logical layout of the disk.

It should be appreciated that the disk layout may be a logical layout as shown in FIG. 7. FIG. 7 shows the same example disk from FIG. 6, but shows the logical block addressing (LBA) layout of the sectors. Some computer systems manipulate and access hard disk drive data using LBA. This mapping scheme addresses the sectors on a disk from 1 to S, where S is the total number of sectors on the disk.

A specific flow example of the testing system is presented below. However, it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

1. A robot removes a disk or platter from a cassette or disk carrier and places the disk on a tester.

2. The robot continues to remove disks from the cassette and place each disk on each of the remaining testers.

3. Each tester then tests a different portion of the disk where the portion size is the disk area divided by the number of testers.

4. If a tester finds an error in the portion of the disk that it tested, the tester notifies the cell controller.

5. The cell controller sends an alarm message to the main process center. The alarm message includes the identification of the defect location on the disk and type of the defect. Because all disks and cassettes are typically tracked through the manufacturing process with, for example, bar codes, or similar identification marks, the manufacturer can identify which part of the process created the bad disk and fix the process.

In a specific implementation, when the tester finds an error in the disk, multiple disks may be tested before the cell controller sends an alarm message to the main process center. For example, after the tester notifies the cell controller of the error and the location on the disk where the error was found, the cell controller may instruct the robot to remove the bad disk and place a new disk in the tester. The cell controller may then instruct the tester to go to the allocated portion of the disk and perform the test again in order to confirm the presence of a defect.

In a specific embodiment, the cell controller instructs one or more additional testers to test new disks at the location where an error was found. Simultaneously testing the same location on multiple disks using multiple testers allows for quicker identification of a manufacturing problem.

This process may be repeated any number of times as specified, for example, by the user or manufacturer. Generally, the greater number of iterations, the greater the confidence level that there may or may not be a problem in the manufacturing process.

For example, a step in the manufacturing process of a disk may involve machines that stamp servo patterns onto the disks. For any number of reasons, a particular stamping machine may cause repeatable defects at a specific location of each disk. For example, over time, the machine may wear because, among other reasons, it has not received proper maintenance. Then, for disks from this particular machine, there will be a higher occurrence of bad disks with errors at a specific location of the disk.

During testing, the tester will note where the defects are on a disk and can specifically target testing at that position for other disks. By testing a specific position or location on a disk, and keeping track of which machines manufactured particular disks, the cell controller and testers will collect data which help determine more quickly which particular machine used in manufacturing the disks should be checked (and perhaps repaired or maintained).

The sooner a pattern of bad disks caused by a particular machine can be identified, the sooner the manufacturer can remove the machine from the manufacturing process. Thus, this will reduce the number of defective disks being manufactured and increase the yield of good disks.

Furthermore, in a specific implementation, the cell controller may perform additional processing, such as statistical analysis. Such analysis may be used to determine whether a found defect was the result of randomness in the manufacturing process or whether there is a high probability that many more disks will have the same error as a result of a faulty manufacturing process.

For example, if an error is found, the cell controller may instruct the robot and tester to test the same location for five other disks. If the error is found only on one other disk, but not the remaining four disks, then the cell controller may conclude that it is unlikely that many more disks will be bad. The cell controller may then withhold sending the alarm message.

However, if the error is found, for example, on at least three out of the five additional disks tested, then the cell controller may conclude that it is likely that there is a problem with the manufacturing process and that many more disks will be bad. In this case, the cell controller may send the alarm message.

Figure 8:
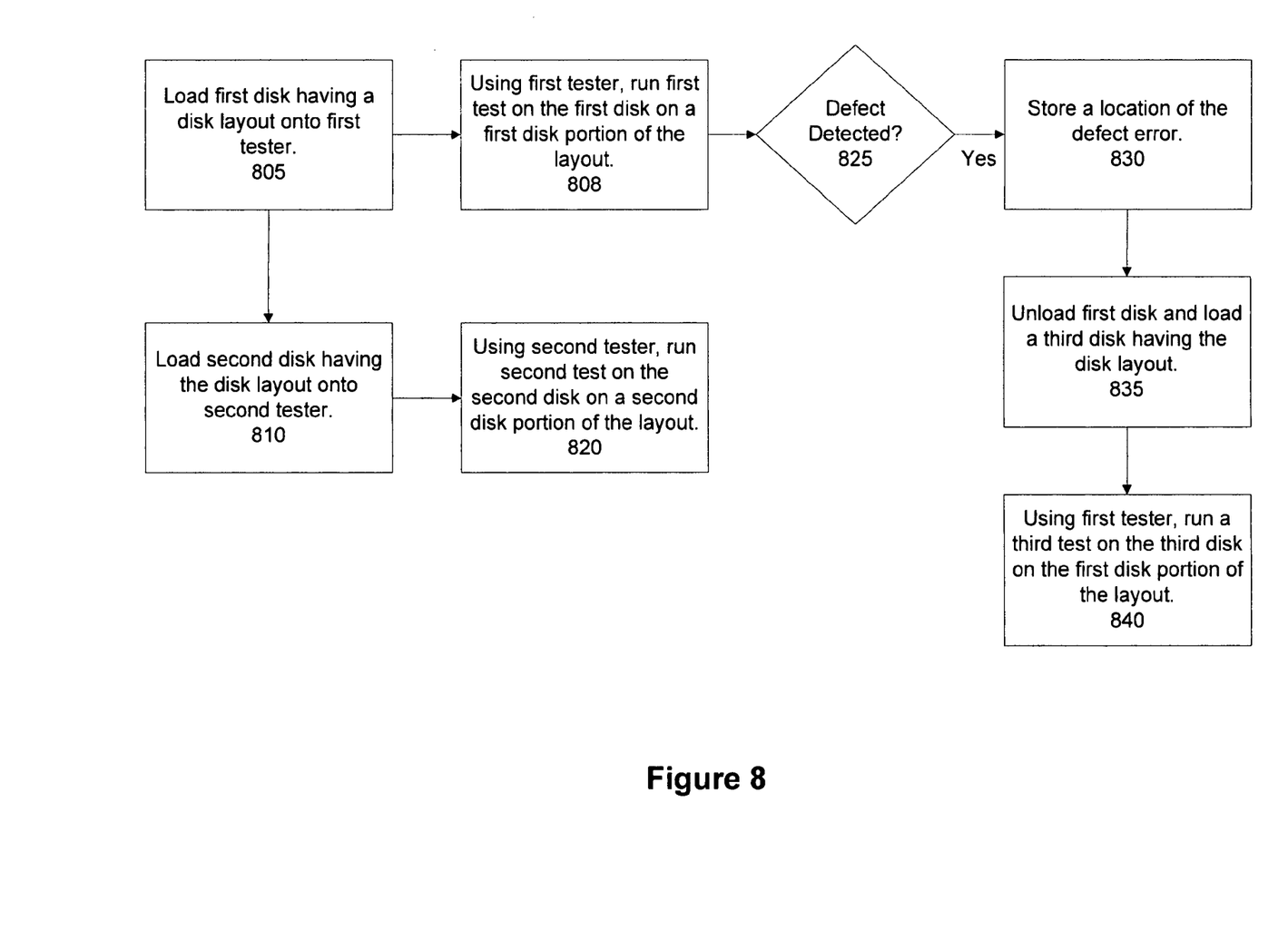
FIG. 8 shows a flow diagram of a testing procedure.

More specifically, FIG. 8 shows a flow diagram for a specific implementation of a testing system. In a step 805 a robotic arm or automated loading mechanism loads a first disk having a disk layout onto a first tester.

In a step 808 the first tester runs a first test on the first disk on a first disk portion of the layout. For example, the first disk portion may include a first set of portions (e.g., sectors) of the layout. The first tester may have a first test program to test the first set of portions.

In a step 810 the robotic arm loads a second disk having the disk layout onto a second tester. In this specific implementation, the first and second disks have the same disk layouts. For example, the first and second disks may have the same number of sectors, tracks, sectors per track, sector size, and so forth. In another implementation, the first and second disks may have different disk layouts.

In a step 820 the second tester runs a second test on the second disk on a second disk portion of the layout. For example, the second disk portion may include a second set of portions (e.g., sectors) of the layout. The second tester may have a second test program to test the second set of portions. Typically, the second test is run concurrently when the first test is being run. The second test may be run in parallel or simultaneously with the first test. A time period for the second test may at least partially overlap a time period for the first test. For example, the first test may start at a first time. The second test may start at a second time, different from the first time. However, at some point in time, the two tests may both be running. In another implementation, the second test is run after the first test is run.

In a specific implementation, the first and second disk portions are different or do not have overlapping sector locations, positions, addresses, or references. Although the first and second disk portions may have the same number of sectors, each sector will be at a different location on the disk layout. For example, given a logical disk layout of S sectors, the first disk portion may have a first subset of the S sectors (e.g., sectors 1, 2, 3, and 4). The second disk portion may have a second subset of the S sectors (e.g., sectors 5, 6, 7, and 8).

In another implementation, the first disk portion is different form the second disk portion because the first and second disk portions do not have overlapping sector locations. This means each and every sector in the second disk portion is not in the first disk portion. In another implementation, the first disk portion is different from the second disk portion because there are at least some sectors in the first disk portion that are not in the second disk portion.

In an implementation, when starting a test on the second tester, the test will start at a different sector or position of the disk layout than the first tester started testing. Further, the sector or position of the layout where the second tester starts testing is never tested by the first tester.

In an implementation, the second tester ends testing at a different sector or position than of the disk layout than where the first tester ends testing. Further, the sector or position of the layout where the second tester ends testing is never tested by the first tester.

In an implementation, the testing approach by the multiple testers tests or evaluates the servo pattern on the disk. As was discussed, this servo pattern is typically placed on the disk by the manufacturer and preexists on the disk before it arrives at the tester. The tester does not write the servo pattern. But the tester will have appropriate hardware or a read head that is capable of reading the servo pattern. In an embodiment, when the tester detects an error in the servo pattern, the error is flagged (or logged) as discussed. Generally, the tester is not capable of rewriting or otherwise correcting the servo pattern (e.g., servo pattern was originally laser written).

When testing the servo pattern, the read servo pattern is read and compared to an expected servo pattern result or reference servo pattern. For example, in an implementation, a variation between the read servo pattern and expected pattern is a defect. In a further implementation, if the variation or deviation between the read servo pattern and the reference servo pattern exceeds a threshold value then there may be a defect in the disk.

Furthermore, the testing approach by the multiple testers is also applicable to testing of write and read errors on the magnetic media. For example, a tester will write data onto the disk to ensure the disk can be written properly. An error that occurs during the write is a write error. Then the tester will attempt to read this same data off the disk to ensure the write occurred properly. An error that occurs during the read is a read error.

During testing, the testers can test for servo pattern read errors, magnetic disk write errors, or magnetic disk read errors, or any combinations of such errors. Therefore, the testing technique can include servo pattern testing only, magnetic read testing only, magnetic write testing only, servo pattern and magnetic read testing only, servo pattern and magnetic write testing only, servo pattern and magnetic read and write testing, or any other combinations of these or other types of testing.

In a specific implementation, the location of the defect error is stored, the disk is unloaded from the tester, a new disk is placed on the tester, and the tester runs a test on the new disk.

For example, when a defect is detected on the first disk (825) the system stores a location of the defect error (830). In addition to system memory, the location of the defect can be stored in nonvolatile or mass storage, such as a hard disk. Furthermore, the location of the defect can be stored in the database. The location may include information indicating which surface of the first disk the defect was found, a sector number, a track number, a cluster number, a range of sector numbers, a range of track numbers, a range of cluster numbers, or combinations of these.

In a step 835, the robotic arm unloads the first disk from the first tester and loads a third disk having the disk layout. In a step 840 the first tester runs a third test on the third disk on the first disk portion of the layout.

This process (e.g., steps 830-840) may be repeated any number of times using a new disk each time to help determine whether there is a pattern of defects. The process may be repeated throughout a specific time period. The system includes a counter that counts or keeps track of a number of defects found in the specific time period.

It should also be appreciated that a similar process may be followed if a defect is detected on the second disk. That is, a location of the defect error is stored. The robotic arm unloads the second disk from the second tester and loads a fourth disk having the disk layout. The second tester then runs a fourth test on the fourth disk on the second disk portion of the layout.

In a specific implementation, when the number of defects found exceeds a threshold value during the specific time period, the system provides a user-visible indication of a tester error condition. For example, the user-visible indication may be a message shown on a computer display of the system. An indication of the tester error condition (e.g., alarm message) may be transmitted to a main test center which the testers are connected to.

This allows the user to investigate the process problem within the production line (e.g., determine which machine is producing or making defective disks, remove the machine from production, and fix the machine). The machine may be connected to the main test center. The main test center may automatically send a signal to the machine which directs the machine to stop producing disks.

In another implementation, another counter counts a number of disks tested during the specific time period. In this specific implementation, when the number of defects found divided by the number of disks tests exceeds the threshold value during the specific time period, the system indicates a tester error condition. The number of defects found divided by the number of disks tested may be referred to as the error rate.

The threshold value, specific time period, error rate, number of disks to sample, or combinations of these may be inputted by a user via a user input device of the system. Some examples of user input devices include keypads. The keypad may have hard, physical buttons or soft buttons (e.g., buttons on a touch screen display).

Thus, the user can decide, for example, what is an acceptable error rate, what is an unacceptable error rate, the number of disks to sample, the sampling time period, an acceptable margin of error, and the like.

Users desiring a high confidence level may choose to sample a relatively large number of disks or spend relatively more time sampling the disks as compared to users who are willing to accept a lower confidence level. Generally, the confidence level increases in proportion to the sample size. That is, a larger sample size (e.g., larger number of disks tested) leads to a higher confidence level over whether there is a process problem. These users may input a relatively long specific time period (e.g., 1 hour versus 20 minutes) as compared to other users who may be willing to tolerate more uncertainty.

However, a trade-off for the higher level of certainty is the potential accumulation of work-in-progress disks that have defects. In other words, during the time spent sampling the disks to achieve a certain confidence level, a machine may continue to produce disks having defects. This batch of disks may then have to be destroyed or scrapped, sold at a lower price because of their defects, mapped to avoid the defects, or combinations of these.

However, other users may decide to accept a lower level of certainty in return for earlier notification of potential problems. This can lower the number of faulty work-in-progress disks.

In a specific implementation, after a defect is detected, the testing for that specific disk is stopped. The tester includes executable code that ceases further testing of that disk at that tester. The disk may be flagged so that the disk is not placed into a hard drive.

Similarly, in a specific implementation, once a specified portion of the disk layout for a disk has been tested the disk is unloaded and is not subsequently tested by any other tester. The disk will include portions outside the specified portion that are untested.

However, in other implementations, the testing of that disk continues after the defect is detected. The testing may continue at that tester or the testing may continue on a different tester. Similarly, in other implementations, portions of the disk outside the specified portion of the disk layout are tested.

Figure 9:
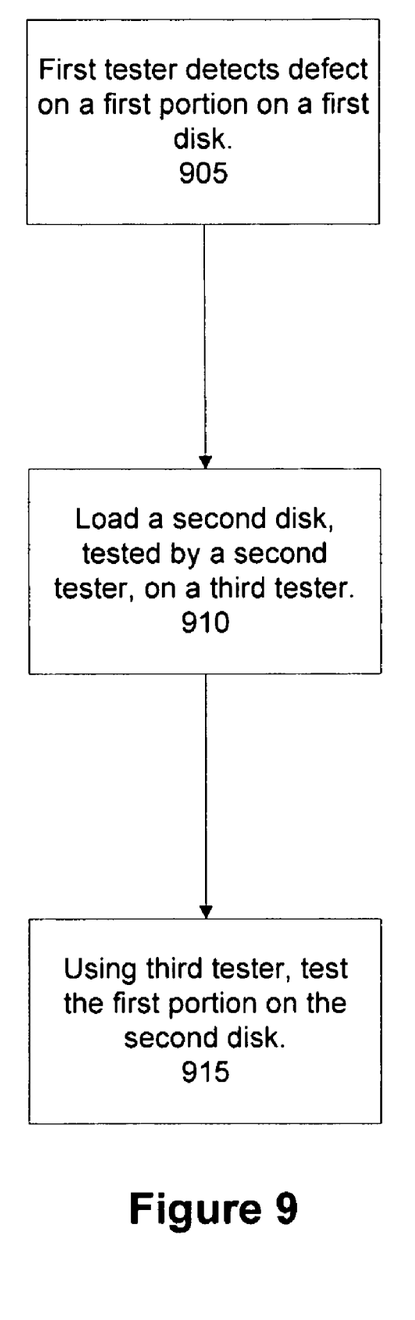
FIG. 9 shows a variation of the flow diagram of FIG. 8.

FIG. 9 shows a variation of the flow diagram in FIG. 8. This flow diagram may similarly be used to help determine whether there is a pattern of defects. In a step 905 the first tester testing a first disk tests a first portion of N portions of a layout and detects a defect.

In a step 910 a robotic arm loads a second disk that has already been tested by a second tester onto a third tester. That is, the second tester has already tested a second portion of N portions of the layout on the second disk.

In this specific implementation, the third tester is separate from the first and second testers or N testers. The third tester may be used as a verification (e.g., double verification) tester.

In a step 915 the third tester tests the first portion on the second disk. This helps determine whether the second disk has defects and whether there is a pattern of defects. For example, the second tester which tested the second disk may not have detected a defect on the second disk since the second tester only tested the second portion on the second disk—and not the first portion on the second disk. However, since the first tester detected a defect in the first portion on the first disk, it may be desirable to determine whether or not defect is also present in the first portion on the second disk.

The third tester is provided with code to test specific portions of the N portions of a layout. In a specific implementation, the code is provided on the fly (e.g., as needed or while at least one other tester is running). Thus, the third tester can be directed to test any portion of the layout. Typically, the portion to be tested by the third tester will not have been previously tested by any of the testers. However, in other implementations, the portion to be tested will have been tested by at least one of the testers.

After the first tester detects a defect in the first portion on the first disk (905), the first tester sends a signal to a main controller to which the first, second, and third testers are connected. The signal includes information identifying the first portion (i.e., the portion in which the defect was found). Then, the main controller directs the robotic arm to load the second disk onto the third tester. The main controller provides code to the third tester that directs the third tester to test the first portion on the second disk.

In another implementation, the code is not provided on-the-fly. For example, the third tester may be preprogrammed with code to test all of the N portions of the layout of a disk.

Figure 10:
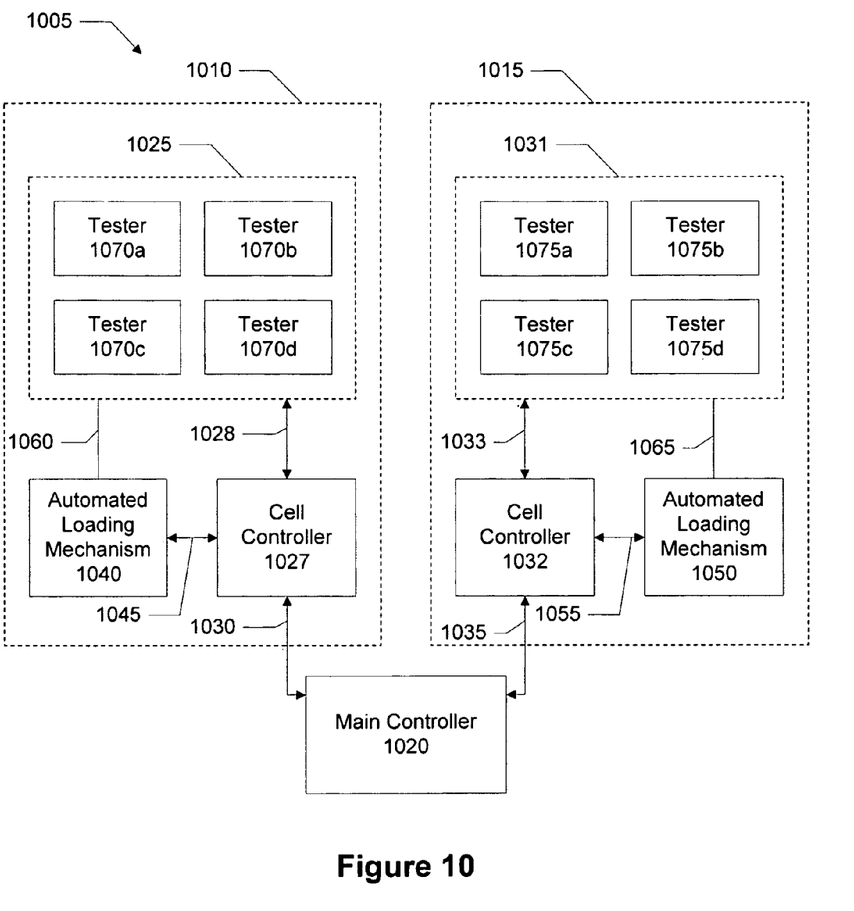
FIG. 10 shows a block diagram of another implementation of a testing system.

FIG. 10 shows a block diagram of another specific implementation of a testing system 1005. This system includes two work cells 1010 and 1015. Each work cell includes an automated loading mechanism, a group of testers, and cell controller connected to a main controller 1020.

Specifically, a first group 1025 of N testers in work cell 1010 is connected to a cell controller 1027 via a line 1028. Cell controller 1027 is connected to the main controller via a line 1030. A second group of M testers 1031 in work cell 1015 is connected to a cell controller 1032 via a line 1033. Cell controller 1032 is connected to the main controller via a line 1035. An automated loading mechanism 1040 is connected via a line 1045 to cell controller 1027. Similarly, an automated loading mechanism 1050 is connected via a line 1055 to cell controller 1032.

Loading mechanism 1040 has, for example, a robotic arm 1060 to load and unload disks from the first group of testers. Similarly, loading mechanism 1050 has a robotic arm 1065 to load and unload disks from the second group of testers.

A system can have any number of work cells. A work cell can have any number (e.g., N or M) of testers. Typically, N and M are integers 2 or greater. N and M may be the same or different. In the example shown in FIG. 10, N and M are each 4. That is, the first group of testers includes four testers including testers 1070a, 1070b, 1070c, and 1070d. The second group of testers includes four testers including testers 1075a, 1075b, 1075c, and 1075d.

In this specific implementation, the testing system is designed to test a layout of at least N+M portions to be tested. Each tester or cell controller includes executable code to test a specific portion of the N+M portions. Thus, tester 1070a includes a first executable code to test a first portion of the N+M portions. Tester 1070b includes a second executable code to test a second portion of the N+M portions. Tester 1070c includes a third executable code to test a third portion of the N+M portions. Tester 1070d includes a fourth executable code to test a fourth portion of the N+M portions. Tester 1075a includes a fifth executable code to test a fifth portion of the N+M portions, and so forth.

Generally, the first portion does not overlap with the second, third, fourth, or fifth portions. The second portion does not overlap with the third, fourth, or fifth portions. The third portion does not overlap with the fourth or fifth portions. The fourth portion does not overlap with the fifth portion. In another implementation, two or more portions overlap. A size of each of the portions may be approximately the same or different.

In a specific implementation, the executable code ceases further testing of the magnetic disk upon detecting a defect. For example, upon detecting a first defect error on a magnetic disk at tester 1070a, the first executable code ceases further testing of the magnetic disk at the first tester.

The executable code may be included with the cell controller. In other words, the cell controller runs the executable code or software. The software may be firmware stored on a flash memory device of the cell controller so that the firmware can be updated (e.g., connect cell controller to a universal serial bus (USB) to flash firmware). The updates can include bug fixes, new features, or both.

The executable code can include the instructions for coordinating the various testers to test specific portions of the disk layout, the statistical analysis tools for determining when to report a disk defect, instructions for directing the testers to perform specific tests (e.g., servo pattern testing), acceptable and unacceptable variations between, for example, a read servo pattern and a reference servo pattern, and the like as discussed in this application. In a specific implementation, the executable code may be purchased separately from the cell controller. That is, the executable code may be purchased as a stand-alone piece of software.

In various implementations, the magnetic disk is not further tested by any of the other testers. The magnetic disk is tested by at least one other tester. The at least one other tester may or may not be the first tester. The at least one other tester may be a tester that is not part of the N+M testers.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of testing a magnetic disk comprising:
using a first robotic arm, loading a first magnetic disk having a disk layout onto a first tester;
using the first robotic arm, loading a second magnetic disk having the disk layout onto a second tester;
using the first tester, running a first test on the first magnetic disk on a first disk portion of the disk layout;
using the second tester, running a second test on the second magnetic disk on a second disk portion of the disk layout, wherein the second disk portion is different from the first disk portion, and the second test is being run concurrently when the first test is being run;
while the running a first test on the first magnetic disk, after detecting a defect error on the first magnetic disk, storing a location of the defect error, unloading the first magnetic disk, and loading a third magnetic disk; and using the first tester, running a third test on the third magnetic disk on the first disk portion of the disk layout.

2. The method of claim 1 wherein the defect error detected on the first magnetic disk error is a first defect error identified during the first test.

3. The method of claim 1 wherein there is no overlapping sector locations between the first and second magnetic disks.

4. The method of claim 1 wherein the defect comprises a servo pattern read error.

5. The method of claim 1 wherein the defect comprises at least one of a write magnetic media error or read magnetic media error.

6. The method of claim 2 comprising:
counting a number of first defect errors when testing using the first tester during a first time period; and
when the number of first defect errors exceeds a threshold value during the first time period, providing a user-visible indication of a first tester error condition.

7. The method of claim 6 wherein the user-visible indication of a first tester error condition is shown on a computer display.

8. The method of claim 2 comprising:
counting a number of first defect errors when testing using the first tester during a first time period;
counting a number of magnetic disks tested during the first tester during a first time period;
when the number of first defect errors divided by the number of magnetic disks tests exceeds a threshold value during the first time period, indicating a first tester error condition.

9. The method of claim 8 comprising:
transmitting an indication of the first tester error condition to a main test center, which the first and second testers are coupled to.

10. A method of testing magnetic disks comprising:
providing N testers, wherein N is an integer 2 or greater and a magnetic disk layout has at least N portions to be tested;
using a first test program for a first tester of the N testers to test a first portion of the N portions; and
using a second test program for a second tester of the N testers to test a second portion of the N portions, wherein the first portion of the disk layout has no overlap with the second portion of the disk layout;
providing a third tester, separate from the N testers;
providing code to the third tester to test the first portion of the N portions; and
upon detecting a defect error on a first magnetic disk tested by the first tester, loading a second magnetic disk that has already been tested by the second tester onto the third tester.

11. The method claim 10 comprising:
providing at least one automated loading mechanism for the N testers;
via the automated loading mechanism, loading a first magnetic disk onto the first tester;
after the first magnetic disk has been tested by the first tester, via the automated loading mechanism, unloading a first magnetic disk from the first tester, wherein the first magnetic disk is not subsequently tested by any other tester that can be loaded via the automated loading mechanism.

12. The method of claim 10 wherein the first test program evaluates a magnetic disk for servo pattern read errors.

13. The method of claim 10 wherein the first test program evaluates a magnetic disk for read or write errors.

14. The method of claim 10 comprising:
using the third tester, testing the first portion of the N portions on the second magnetic disk.

15. The method of claim 14 wherein during the test of the second magnetic disk on the second tester, detecting no defect errors.

16. A system for testing magnetic disks comprising:
a first group of N testers, wherein N is an integer 2 or greater;
a first automated loading mechanism for the N testers of the first group;
a second group of M testers, wherein M is an integer 2 or greater and a magnetic disk layout has at least N+M portions to be tested;
a second automated loading mechanism for the M testers of the second group;
a first tester of the first group, wherein the first tester has first executable code to test of a first portion of the N+M portions;
a second tester of first group, wherein the second tester has second executable code to test of a second portion of the N+M portions;
a third tester of the second group, wherein the third tester has third executable code to test of a third portion of the N+M portions; and
a fourth tester of the first group, wherein the fourth tester has fourth executable code to test of a fourth portion of the N+M portions, wherein the first portion does not overlap the second, third, or fourth portions.

17. The system of claim 16 comprising:
a main controller, wherein the main controller is coupled to the first group and second group of testers.

18. The system of claim 16 wherein a size of each of the first, second, third, and fourth portions is approximately the same.

19. The system of claim 16 wherein upon detecting a first defect error on a magnetic disk at the first tester, the first executable code ceases further testing of the magnetic disk at the first tester.

* * * * *